US00RE40450E

(19) United States
(12) Reissued Patent
Fujimori

(10) Patent Number: US RE40,450 E
(45) Date of Reissued Patent: Aug. 5, 2008

(54) LIQUID CRYSTAL PROJECTOR

(75) Inventor: Motoyuki Fujimori, Suwa (JP)

(73) Assignee: Seiko Epson Corporation, Tokyo (JP)

(21) Appl. No.: 09/985,148

(22) PCT Filed: Oct. 27, 1994

(86) PCT No.: PCT/JP94/01812

§ 371 (c)(1),
(2), (4) Date: Apr. 23, 1996

(87) PCT Pub. No.: WO95/12142

PCT Pub. Date: May 4, 1995

Related U.S. Patent Documents

Reissue of:
(64) Patent No.: 5,978,054
Issued: Nov. 2, 1999
Appl. No.: 08/635,891
Filed: Apr. 23, 1996

(30) Foreign Application Priority Data

Oct. 27, 1993 (JP) ..... 5-269061

(51) Int. Cl.
*G02F 1/1335* (2006.01)
*G02F 1/1333* (2006.01)

(52) U.S. Cl. ..... 349/60; 349/8; 349/58
(58) Field of Classification Search ..... None
See application file for complete search history.

(56) References Cited

U.S. PATENT DOCUMENTS

| | | | | |
|---|---|---|---|---|
| 4,850,685 A | | 7/1989 | Kamakura et al. | 349/8 |
| 5,311,341 A | | 5/1994 | Hirai | 359/88 |
| 5,653,522 A | * | 8/1997 | Loucks | 353/122 |
| 6,057,894 A | * | 5/2000 | Kobayashi | 349/5 |
| 6,097,546 A | * | 8/2000 | Yoshii et al. | 349/7 |

FOREIGN PATENT DOCUMENTS

| | | | |
|---|---|---|---|
| JP | 61-099118 | 5/1986 | |
| JP | UM-A-62-47289 | 3/1987 | |
| JP | 62-125791 | 6/1987 | |
| JP | 362240936 | 10/1987 | 349/8 |
| JP | 63-010128 | 1/1988 | |
| JP | A-63-90985 | 4/1988 | |
| JP | 363265218 | 11/1988 | 349/8 |
| JP | A-1-158480 | 6/1989 | |
| JP | 1-179126 A | 7/1989 | |
| JP | 1-289912 A | 11/1989 | |
| JP | UM-A-2-271119 | 2/1990 | |
| JP | A-3-63690 | 3/1991 | |
| JP | 3-92851 | 3/1991 | |
| JP | UM-A-3-65108 | 6/1991 | |
| JP | A-3-153212 | 7/1991 | |
| JP | A-3-233548 | 10/1991 | |
| JP | 03-293390 | 12/1991 | |
| JP | A-4-58242 | 2/1992 | |
| JP | U-5-4686 | 1/1993 | |
| JP | A-05-080321 | 4/1993 | |
| JP | 5-52806 | 7/1993 | |
| JP | 5-241120 | 9/1993 | |
| JP | 6-186584 | 7/1994 | |
| JP | 62-181909 | 11/1997 | |

* cited by examiner

*Primary Examiner*—Julie-Huyen L. Ngo
(74) *Attorney, Agent, or Firm*—Oliff & Berridge, PLC

(57) ABSTRACT

A liquid crystal projector has three liquid crystal panels for modulating first color light, second color light, and third color light respectively. A light synthetic device synthesizes each color light modulated by the liquid crystal panels. A projection lens projects the light synthesized by the light synthetic device. Setting members set the liquid crystal panels to the light synthetic device and wedge-type spacer members adjust the position of the liquid crystal panels in their planar direction and the direction perpendicular to the planar direction. *The liquid crystal panels are secured to the light synthetic device through the setting members and spacer members.*

[The liquid crystal panels are secured to the light synthetic device through the setting members and spacer members.]

48 Claims, 11 Drawing Sheets

LIQUID CRYSTAL PROJECTOR

Matter enclosed in heavy brackets [ ] appears in the original patent but forms no part of this reissue specification; matter printed in italics indicates the additions made by reissue.

TECHNICAL FIELD

The present invention relates to front-type and rear-type liquid crystal projectors using a liquid crystal panel, particularly to a control mechanism of the liquid crystal panel.

BACKGROUND ART

As a conventional liquid crystal panel setting structure, a structure in which a liquid crystal panel is directly secured to a [photosynthetic] *light synthetic* prism is disclosed in the official gazettes of Japanese Patent Application Laid-Open No. 4-10128 and Japanese Patent Application No. 4-270557. In these official gazettes, it is particularly shown that an imaging optical system is decreased in size, weight, and number of parts and the cost is decreased due to reduction of assembling and controlling operations by emitting a mechanism for performing picture-element alignment control (hereafter referred to as alignment control) between a plurality of liquid crystal panels (also known as light bulbs) for modulating the light separated into red, green, and blue and arrangement control (hereafter focus control) of each liquid crystal layer surface serving as an object within the allowable focal depth of a projection lens.

In the case of the structure disclosed in these official gazettes, however, because a liquid crystal panel is firmly secured to a [photosynthetic] *light synthetic* prism, it is very troublesome to remove the liquid crystal panel if repair or reproduction is necessary. Repair of a product is not frequently required after the product is shipped from a factory to a market. In a factory before shipping a product, however, repair and reproduction are frequently required due to the following causes.

(1) Replacement of a defective product with a non-defective product because a pattern is disconnected due to chipping, a circuit device is broken down due to static electricity incoming from an electrode terminal, or contamination is caused by hand oil or adhesive.

(2) Replacement of a defective product with a non-defective product when a claim suddenly occurs because each manufacturing process is not stabilized in the beginning of mass production of a liquid crystal panel.

Moreover, decreasing the alignment control accuracy to ½ picture elements or less between picture elements is indispensable to reduce the unclearness of a screen and prevent color drift. When considering the magnification chromatic aberration of a projection lens and the accuracy deviation of the synthetic surface of a [photosynthetic] *light synthetic* prism, it is necessary to keep the control accuracy within several microns. Moreover, though the focus control accuracy depends on a set value of the allowable scattering circle of a projected image and a set F value, the allowable focal depth comes to approx. 100 μm and thus, control is necessary in this range. Therefore, an exclusive expensive regulator capable of adjusting six axial directions is necessary. Furthermore, because it is impossible to set the expensive regulator to every foothold for performing after-sale services, a product must be repaired or reproduced by returning it to a limited foothold or a manufacturing factory. Therefore, the following problems are pointed out.

(1) After-sale service is interrupted or a user must pay much money when replacing a defective imaging optical-system unit with a new one.

(2) Also when performing repair or reproduction in a manufacturing factory, the serviceability ratio in mass production is lowered and resultingly, the cost is increased.

Moreover, a liquid crystal panel and a [photosynthetic] *light synthetic* prism are expensive parts. Therefore, when three high-precision liquid crystal panels for red, blue, and green capable of corresponding to the 640×480 dot arrangement are used, it is very wasteful to do away with them as defective products because they account for 20 to 40% of the part cost and the cost increases.

DISCLOSURE OF THE INVENTION

It is an object of the present invention to provide a liquid crystal projector simplifying the structure, using less number of parts, and decreasing the man-hour for assembling and controlling operations.

It is another object of the present invention to provide a liquid crystal projector making it possible to easily replace a manufactured liquid crystal panel.

It is still another object of the present invention to provide a liquid crystal projector making it possible to obtain a high quality image by simplifying the assembling and controlling operations.

It is still another object of the present invention to provide a compact and lightweight liquid crystal projector by realizing a small optical system.

The liquid crystal projector according to one mode of the present invention comprises three liquid crystal panels for modulating the first color light, second color light, and third color light respectively, [photosynthetic] *light synthetic*, i.e. light synthetic means in which four rectangular prisms are arranged so that the top side of each right angle fits and contacts each other and two types of selected wavelength surfaces having a different wavelength selectiveness are formed to be cruciform on the contact surface in each prism to synthesize the color lights modulated by the liquid crystal panels, a projection lens for projecting the light synthesized by the [photosynthetic] *light synthetic* means, a setting member located between a pair of opposite sides of liquid crystal panels in a direction in common to the liquid crystal panels and a pair of sides of the incident surface of the [photosynthetic] *light synthetic* means corresponding to a pair of opposite sides of a liquid crystal panel to set the liquid crystal panels to the [photosynthetic] *light synthetic* means, and a wedge-type spacer member for adjusting the position of a liquid crystal panel in its planar direction and the direction perpendicular to the planar direction. Moreover, the liquid crystal panels are secured to the [photosynthetic] *light synthetic* means through the setting member and the spacer member.

In the case of the liquid crystal projector according to another mode of the present invention, a liquid crystal panel, setting member, spacer member, and [photosynthetic] *light synthetic* means are fixed each other by an adhesive in the above liquid crystal projector.

In the case of the liquid crystal projector according to still another mode of the present invention, a setting member and a spacer member comprise a member capable of transmitting light in the above liquid crystal projector.

In the case of the liquid crystal projector according to still another mode of the present invention, a spacer member is arranged between a setting member and [photosynthetic] *light synthetic* means or between the setting member and a liquid crystal panel in the above liquid crystal projector.

In the case of the liquid crystal projector according to still another mode of the present invention, a pair of setting members is arranged at the facing side of a liquid crystal panel along its vertical direction and a pair of setting members form a channel for vertically passing a cooling air together with a liquid crystal panel and [photosynthetic] *light synthetic* means in the above liquid crystal projector.

In the case of the liquid crystal projector according to still another mode of the present invention, a liquid crystal panel is stored in and secured to a conductive shield case in the above liquid crystal projector.

In the case of the liquid crystal projector according to still another mode of the present invention, an adhesive is softened when heated in the above liquid crystal projector. Therefore, when repair or reproduction is necessary, a setting member can be removed by heating a bonded portion.

The liquid crystal projector according to still another mode of the present invention comprises three liquid crystal panels for modulating the first color light, second color light, and third color light respectively, [photosynthetic] *light synthetic* means in which four rectangular prisms are arranged so that the top side of each right angle fits and contacts each other and two types of selected wavelength surfaces having a different wavelength selectiveness are formed to be cruciform on the contact surface in each prism to synthesize the color lights modulated by the liquid crystal panels, a projection lens for projecting the light synthesized by the [photosynthetic] *light synthetic* means, a wedge-type spacer member for adjusting the position of the liquid crystal panels in their planar direction and the direction perpendicular to the planar direction, and a protrusion which is formed on a pair of opposite sides of an incident surface in a direction in common to the incident surfaces, and engaged with the spacer member. Moreover, the liquid crystal panels are secured to the [photosynthetic] *light synthetic* means through the spacer member and the protrusion.

The liquid crystal projector according to still another mode of the present invention comprises at least one liquid crystal panel arranged on an object position of an imaging optical system provided with a projection lens and [photosynthetic] *light synthetic* means, a holding member to which the liquid crystal panel is secured, a frame located between the holding member and the [photosynthetic] *light synthetic* means, and a wedge-type spacer member located between the frame and the [photosynthetic] *light synthetic* means to adjust the position of the liquid crystal panel in its planar direction and the direction perpendicular to the planar direction. Moreover, the holding member is provided with a body at whose central portion a window is opened and in which a liquid crystal panel is arranged so as to cover the window, and an elastic member engaging with the frame to temporarily secure the body to the frame. Furthermore, the liquid crystal panel is secured to the [photosynthetic] *light synthetic* means through the holding member, the frame and the spacer member.

In the case of the liquid crystal projector according to still another mode of the present invention, the outer periphery of a liquid crystal panel is fixed by means of point bonding at least several points by an adhesive with a relatively high securing force when the liquid crystal panel is secured to a holding member and the remaining portion is fixed by an elastic adhesive in the above liquid crystal projector.

In the case of the liquid crystal projector according to still another mode of the present invention, a position adjusting member for adjusting the position of a holding member is arranged on a frame in the above liquid crystal projector.

In the case of the liquid crystal projector according to still another mode of the present invention, a joint is provided between the body of a holding member and an elastic member, the joint and a frame are fixed by a screw, and a hole to be fitted to a positioning dowel on the frame is formed on the holding member in the above liquid crystal projector.

The liquid crystal projector according to still another mode of the present invention comprises at least one liquid crystal panel arranged at the object position of an imaging optical system provided with a projection lens and [photosynthetic] *light synthetic* means, a support frame arranged so as to face the incident surface of the [photosynthetic] *light synthetic* means and supporting the margin of the liquid crystal panel, and a wedge-type spacer member located between the support frame and the liquid crystal panel to adjust the liquid crystal panel in its planar direction and the direction perpendicular to the planar direction. Moreover, the liquid crystal panel is secured to the support frame through the spacer member.

In the case of the liquid crystal projector according to still another mode of the present invention, a projection lens is secured to a support frame in the above liquid crystal projector.

In the case of the liquid crystal projector according to still another mode of the present invention, a support frame also serves as the frame of an optical system including a light separating system and moreover, [photosynthetic] *light synthetic* means comprises a dichroic mirror in the above liquid crystal projector.

The liquid crystal projector according to still another mode of the present invention comprises at least one liquid crystal panel arranged at the object position of an imaging optical system provided with a projection lens and [photosynthetic] *light synthetic* means, a support frame arranged so as to face the incident surface of the [photosynthetic] *light synthetic* means and having a plurality of protrusions, and a holding member to which the liquid crystal panel is secured, which has an opening to be engaged with the protrusion, and in which the opening and the protrusion of the support frame are bonded and fixed. The liquid crystal panel is secured to the support frame through the holding member.

The liquid crystal projector according to still another mode of the present invention comprises three liquid crystal panels for modulating the first color light, second color light, and third color light respectively, [photosynthetic] *light synthetic* means in which four rectangular prisms are arranged so that the top side of each right angle fits and contacts each other and two types of selected wavelength surfaces having a different wavelength selectiveness are formed to be cruciform on the contact surface in each prism to synthesize the color lights modulated by the liquid crystal panels, an outgoing-side polarization plate attached to the incident surface of the [photosynthetic] *light synthetic* means, and a wedge-type spacer member located between the facing side of the liquid crystal panel and the position of the outgoing polarization plate corresponding to the facing side to adjust the position of the liquid crystal panel in its planar direction and the direction perpendicular to the planar direction. The liquid crystal panel is secured to the [photosynthetic] *light synthetic* means through the spacer member and the outgoing-side polarization plate.

The liquid crystal projector according to still another mode of the present invention comprises at least one liquid crystal panel arranged at the object position of an imaging optical system, an outgoing-side polarization plate attached to the surface of the liquid crystal panel at the [photosynthetic] *light synthetic* means side, and a wedge-type spacer member located between the outgoing-side polarization plate and the liquid crystal panel to adjust the position of the liquid crystal panel in its planar direction and the direction perpendicular to the planar direction. Moreover, a protrusion having a slope is formed on the outgoing-side polarization plate, the slope of the protrusion are engaged with the spacer to bond and fix them, and the liquid crystal panel is secured to the [photosynthetic] *light synthetic* means through the spacer member and the outgoing-side polarization plate.

The liquid crystal projector according to still another mode of the present invention comprises at least one liquid crystal panel arranged at the object position of an imaging optical system provided with a projection lens and [photosynthetic] *light synthetic* means, an outgoing-side polarization plate attached to the surface of the [photosynthetic] *light synthetic* means side of the liquid crystal panel, a transparent sheet attached to the incident surface of the [photosynthetic] *light synthetic* means, a wedge-type spacer member located between the outgoing-side polarization plate and the transparent sheet to adjust the position of the liquid crystal panel in its planar direction and the direction perpendicular to the planar direction. Moreover, the liquid crystal panel is secured to the [photosynthetic] *light synthetic* means through the outgoing-side polarization plate, spacer member, and transparent sheet.

The liquid crystal projector according to still another mode of the present invention forms a protrusion having a slope on a transparent sheet and engages the slope of the protrusion with a spacer and bond and fix them in the above liquid crystal projector.

Because the present invention is constituted as described above, it has the following advantages.

(1) Because a mechanism for alignment control and focus control is omitted, an optical system is decreased in size and weight by the values equivalent to the size and weight of the mechanism and thus, a compact liquid crystal projector is realized. In the case of downsizing a liquid crystal panel by using a polysilicon TFT, to downsize the optical system with the panel, the above control mechanism mainly prevents an optical system from being downsized. According to the present invention, however, it is possible to omit the control mechanism and therefore, downsize the apparatus.

(2) Moreover, it is possible to increase a cooling-air channel space by using the space of the omitted control mechanism. Furthermore, because a setting member and a frame securely form a channel, the cooling efficiency is improved and thereby, cooling is realized by a small fan. Therefore, these points are also advantageous for downsizing.

(3) By securing a liquid crystal panel to [photosynthetic] *light synthetic* means such as a [photosynthetic] *light synthetic* prism, it is possible to prevent the positional deviation between liquid crystal panels. Therefore, it is possible to improve reliabilities such as disturbance resistance, temperature change resistance, and handling resistance. Even when combining members with different thermal expansion coefficients and boding and fixing them, it is possible to prevent deviation and cracking due to temperature change resistance by setting an adhesive, bonding condition, and glass transition point most suitable for a working temperature range. Therefore, it is possible to prevent picture element deviation and correspond to a finer product.

(4) Because a control mechanism is omitted, the part cost and assembling cost can be decreased and moreover, expensive optical parts can be downsized. Thus, costs are greatly decreased.

(5) In particular, because the back-focus value of a projection lens can be decreased, it is possible to properly design the projection lens and moreover, increase the F value. Therefore, the projection light quantity is increased and the cost performance is further improved.

(6) Moreover, even if a defective liquid crystal panel is found in the manufacturing process of a factory or in a market, it is possible to replace the defective liquid crystal panel with a non-defective one and reproduce a product without using an exclusive alignment controller. Therefore, it is possible to greatly decrease the after-sale service cost and moreover, repair the defective liquid crystal panel for a short term and furthermore, improve the serviceability ratio and decrease the defective fraction in mass production of exclusive alignment controllers in a factory.

(7) Furthermore, there is an advantage that focus control can be omitted. Unless the screen size of a liquid crystal panel is changed in the design of a projection lens stressing the telecentric incident light, deviation of focus is further effective by using the fact that practical unclearness is relatively greatly allowed.

(8) Moreover, because a liquid crystal panel is protected by a shield case and a holding member, it is possible to prevent chipping, cracking, dielectric breakdown, or contamination which occurs in handling a product and thereby, improve the yield and after-sale seviceability.

(9) Furthermore, because an optical unit can be formed in which a projection lens, [photosynthetic] *light synthetic* prism, and liquid crystal panel are integrated with a support frame, the handling characteristic and assembling characteristic are improved. Furthermore, it is possible to disuse a master lens for adjustment, decrease the man-hour for adjustment, and prevent bad influences due to deviation of the projection lens characteristic. Furthermore, there is a flexibility to be substituted for the cross dichroic mirror system.

(10) Furthermore, it is possible to integrate a support frame by replacing it with the frame of an optical system.

(11) Furthermore, a cooling-air channel is formed between each of three liquid crystal panels and the incident surface of a prism constituting [photosynthetic] *light synthetic* means and thereby, the cooling effect can be improved.

BEST MODE FOR CARRYING OUT THE INVENTION

Figure 1:
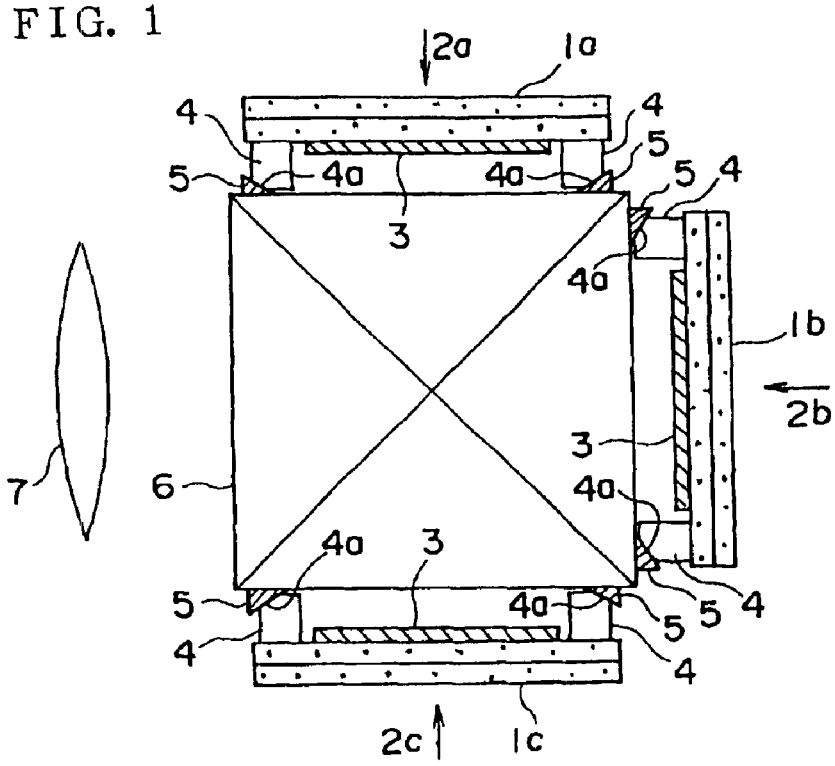
FIG. 1 is a top view showing the structure of an optical unit of the liquid crystal projector of the first embodiment of the present invention.

FIG. 1 is a top view showing the structure of an optical unit of the liquid crystal projector of an embodiment of the present invention. In FIG. 1, liquid crystal panels 1a, 1b, and 1c modulate red light 2a, green light 2b, and blue light 2c obtained by separating the light emitted from a light source (not illustrated) by a separating optical system (not illustrated) in accordance with an image signal output by a control circuit (not illustrated). A polarization plate 3 is arranged at the emitting side of each of the liquid crystal panels 12a, 1b, and 1c, which is attached and secured to the panel glass of each of the liquid crystal panels 1a, 1b, and 1c. A setting member 4 is formed into a prismatic shape made of glass, ceramic, or resin. One side of the prismatic shape is respectively bonded and secured to the both sides of the liquid crystal panels 1a, 1b, and 1c and a slope 4a is formed on the other side of it. A plurality of spacer members 5 are made of wedge-type glass and arranged under the slope 4a. A [photosynthetic] *light synthetic* prism 6 [incudes] *includes* a dichroic layer, the light incident surface of the prism is arranged so as to face the liquid crystal panels 1a, 1b, and 1c. The image light modulated by the liquid crystal panels 1a, 1b, and 1c is synthesized by the dichroic layer and projected to a screen (not illustrated) by a projection lens 7. One side of the setting member 4 is bonded and secured to the panel glass surface of the liquid crystal panels 1a, 1b, and 1c. In this case, one side of the setting member 4 is bonded and secured to the outside of the polarization plate 3 as illustrated so that the setting member 4 does not cover or contact the polarization plate 3 of the emitting side. Moreover, a spacer member 5 is inserted into the gap with a triangular cross section formed by the slope 4a of the setting member 4 and the light incident surface of the [photosynthetic] *light synthetic* prism 6 and they are mutually secured by a bonding layer formed in the minimum gap.

Then, the assembling and alignment control method is described below. The setting member 4 is secured to each of the liquid crystal panels 1a, 1b, and 1c by a photo-curing adhesive which is hardened by visible light and softened by heat to form a liquid crystal panel unit. Then, the liquid crystal panel unit is chucked by an alignment controller and transferred to the light incident surface position of the [photosynthetic] *light synthetic* prism 6. Positional adjustment in X- and Y-axis directions vertical to the optical axis of the projection lens 7 and positional adjustment in the rotational directions of Xθ and Yθ about X and Y axes-are performed and positioning adjustment is performed so that the liquid crystal surface is brought into the focal plane of the projection lens 7.

Then, a plurality of spacer members 5 coated with a photo-curing adhesive are inserted into the gap with a triangular cross section formed by the light incident surface of the [photosynthetic] *light synthetic* prism 6 and the slope 4a of the setting member 4 to harden the adhesive by applying light such as ultraviolet radiation to the adhesive.

Then, focusing is performed also for the liquid crystal panels 1a, 1b, and 1c similarly to the above mentioned and moreover, rotation adjustment in X and Y directions and rotation adjustment of the surface formed by X and Y axes are performed by the alignment controller on the basis of the liquid crystal panel 1b so that picture elements fit each other. After positioning is completed, a wedge 5 coated with a photo-curing adhesive similarly to the above mentioned is inserted into the gap with a triangular cross section formed by the slope 4a of the setting member 4 and the light incident surface of the [photosynthetic] *light synthetic* prism 6 and the adhesive is hardened by applying light such as ultraviolet radiation to the adhesive to form a prism unit.

Figure 2:
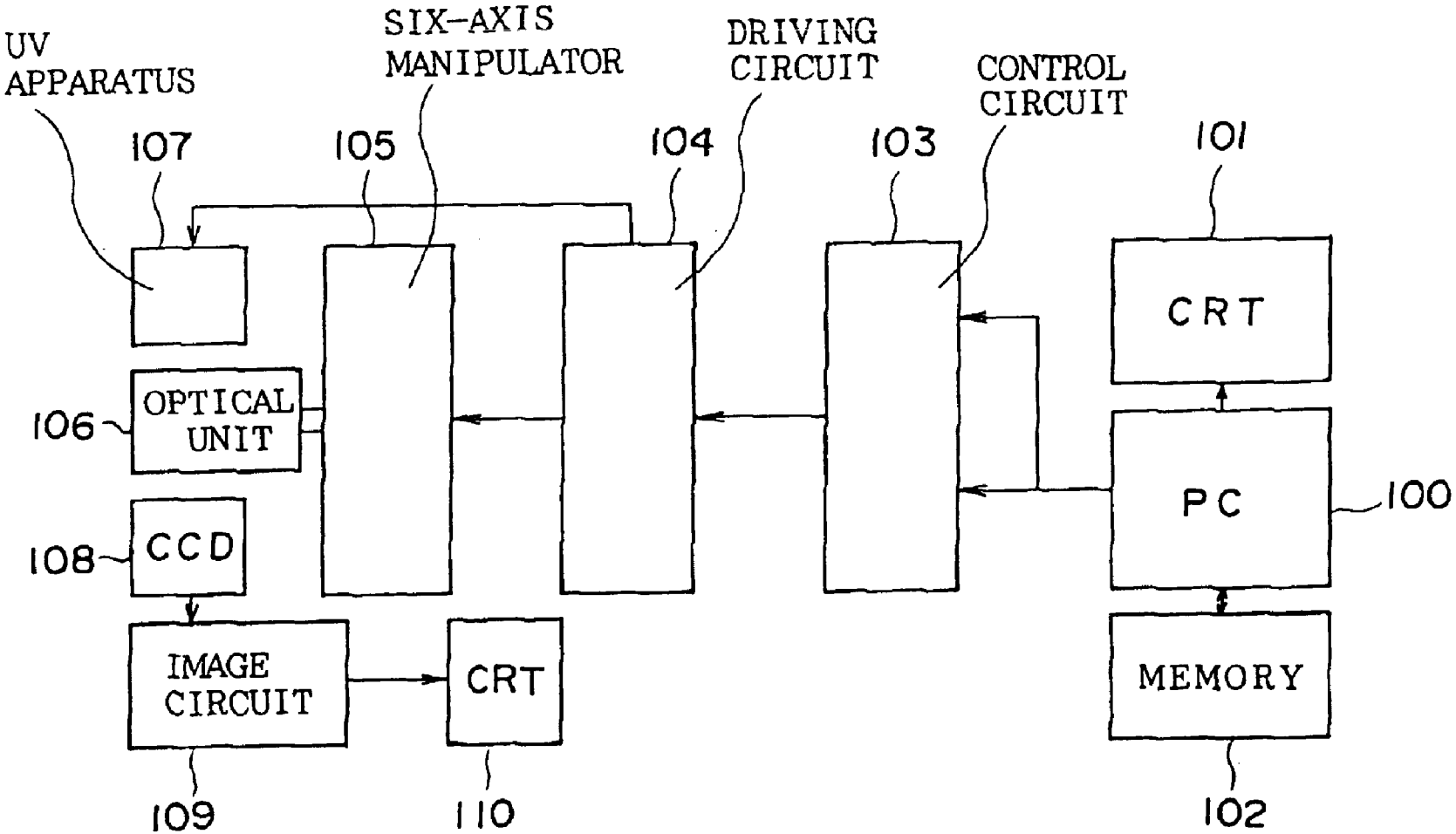
FIG. 2 is a block diagram showing the structure of a controller for performing assembling and alignment control of the optical unit in FIG. 1.

FIG. 2 is a block diagram showing the structure of a controller for performing the above assembling and alignment control. In FIG. 2, a personal computer 100 connects with a CRT 101 and a memory 102 and drives a driving circuit 104 through a controller 103. The driving circuit 104 controls a six-axis manipulator 105 to perform the focus control and alignment control of the liquid crystal panels 1b, 1a, and 1c in FIG. 1. When the above types of control are completed, the driving circuit 104 drives an ultraviolet apparatus 107 and emits light such as ultraviolet radiation to harden the adhesive and secure the setting member 4 to the [photosynthetic] *light synthetic* prism 6. In the case of the above types of control, an image passing through the projection lens 7 of the optical unit 106 is directly picked up by a CCD camera 108 or the image projected onto a screen is picked up by the camera 108 and the signal of the picked-up image is displayed on a CRT 110 through an image circuit 109.

Figure 3A:
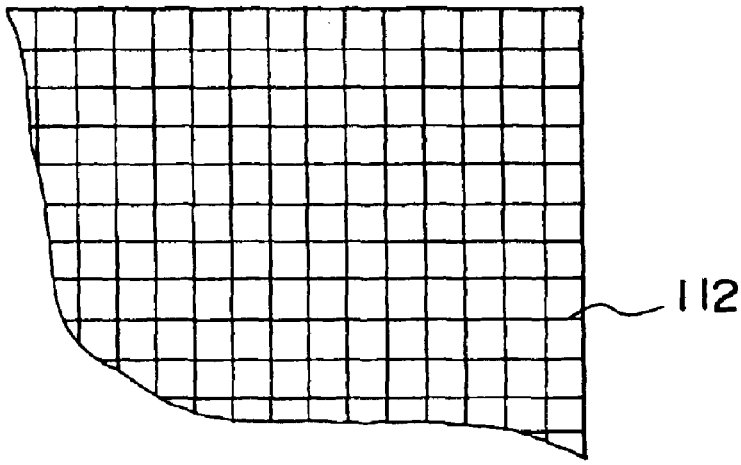
FIGS. 3A and 3B are illustrations of an image displayed on a CRT when performing alignment control.
Figure 3B:
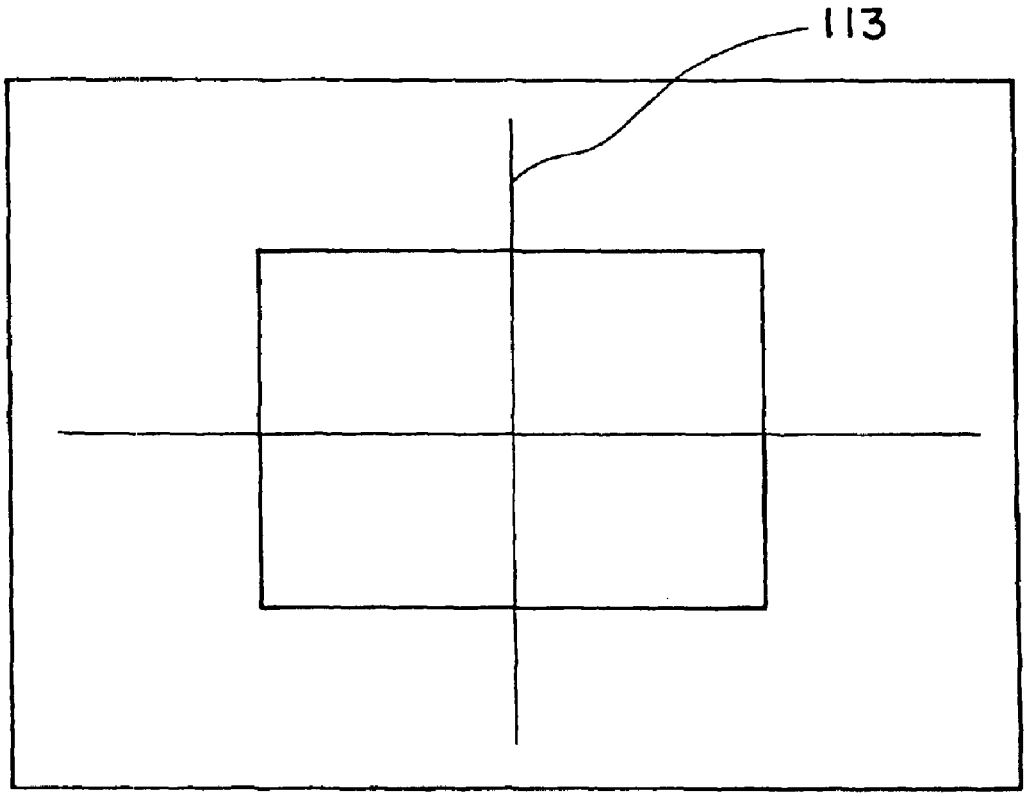

FIGS. 3A and 3B are illustrations of the image displayed on the CRT 110 at the time of the above alignment. FIG. 3A shows a directly-displayed pattern 112 of each picture element of the liquid crystal panels 1a, 1b, and 1c. FIG. 3B shows a test pattern 113 displayed on the liquid crystal panels 1a, 1b, and 1c. An operator operates the personal computer 100 while viewing the displayed pattern and performs the above types of control while controlling the six-axis manipulator 105.

Figure 4A:
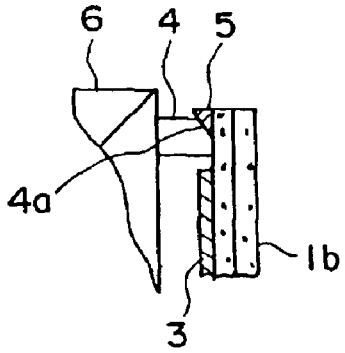
FIGS. 4A to 4C are local top views showing another structure of the setting member in FIG. 1.
Figure 4C:
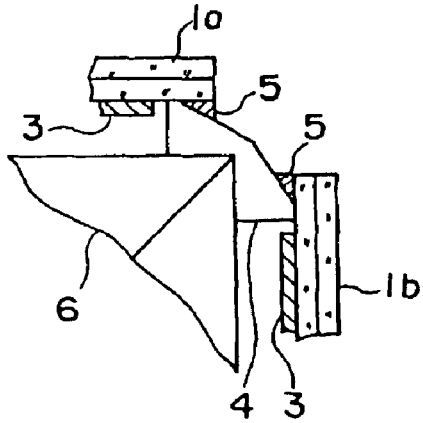
Figure 4B:
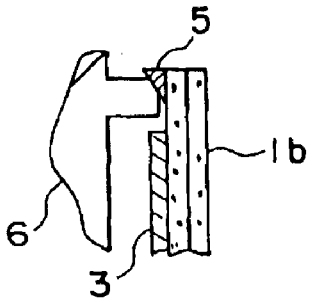

Then, other structures of the holding member 4 in FIG. 1 are described below. FIGS. 4A to 4C are illustrations showing other structures of the setting member 4. In the case of the structure in FIG. 4A, the spacer member 5 is set between the liquid crystal panel 1b and the setting member 4. The gap with a triangular cross section formed between the slope 4a and the liquid crystal panel 1b formed on the other side of the setting member 4 is not constant in most cases. Therefore, by dividing the gap into two or three portions vertically, it is possible to easily secure a bonding area adaptively to the shape of each inserting portion and decrease the value of protrusion to the outside. Thus, interference with an adjacent member can be prevented.

In the case of the example in FIG. 4B, the setting member 4 is integrated with the [photosynthetic] *light synthetic* prism 6 so that assembling can be rationalized. In the case of the example in FIG. 4C, the adjacent setting member 4 is integrated and bonded and secured to a corner of the [photosynthetic] *light synthetic* prism 6 as illustrated.

When a liquid crystal panel becomes defective after manufacturing the optical unit 106 or if a defective product is mixed, it is necessary to heat the bonding portion between each of the liquid crystal panels 1a, 1b, and 1c and the setting member 4 by a drier or a laser beam. Thus, the adhesive is softened by heating and the liquid crystal panels 1a, 1b, and 1c can smoothly be removed. In this case, because the setting member 4 is kept secured to the [photosynthetic] *light synthetic* prism 6, the liquid crystal panel unit can be replaced by bonding and securing a non-defective liquid crystal panel unit to one side of the setting member 4. Moreover, in this case, because the mutual positional relation is not changed in the focus direction, it is possible to omit the focus control.

Figure 5:
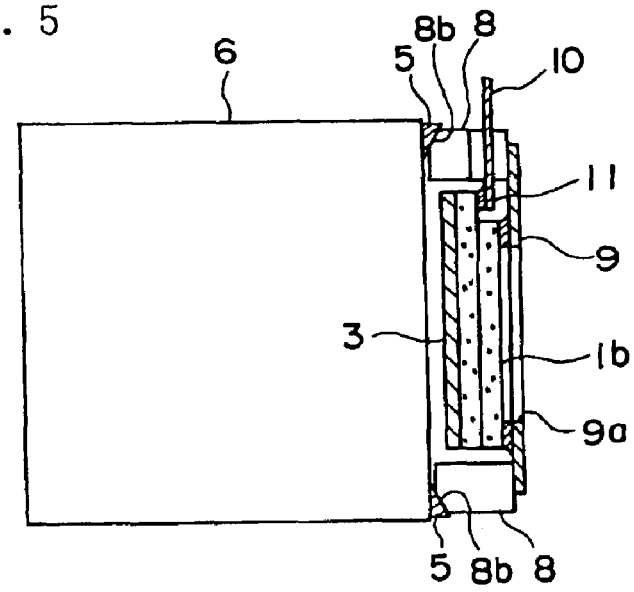
FIG. 5 is a top view showing a part of the structure of an optical unit of the liquid crystal projector of another embodiment of the present invention.
Figure 6:
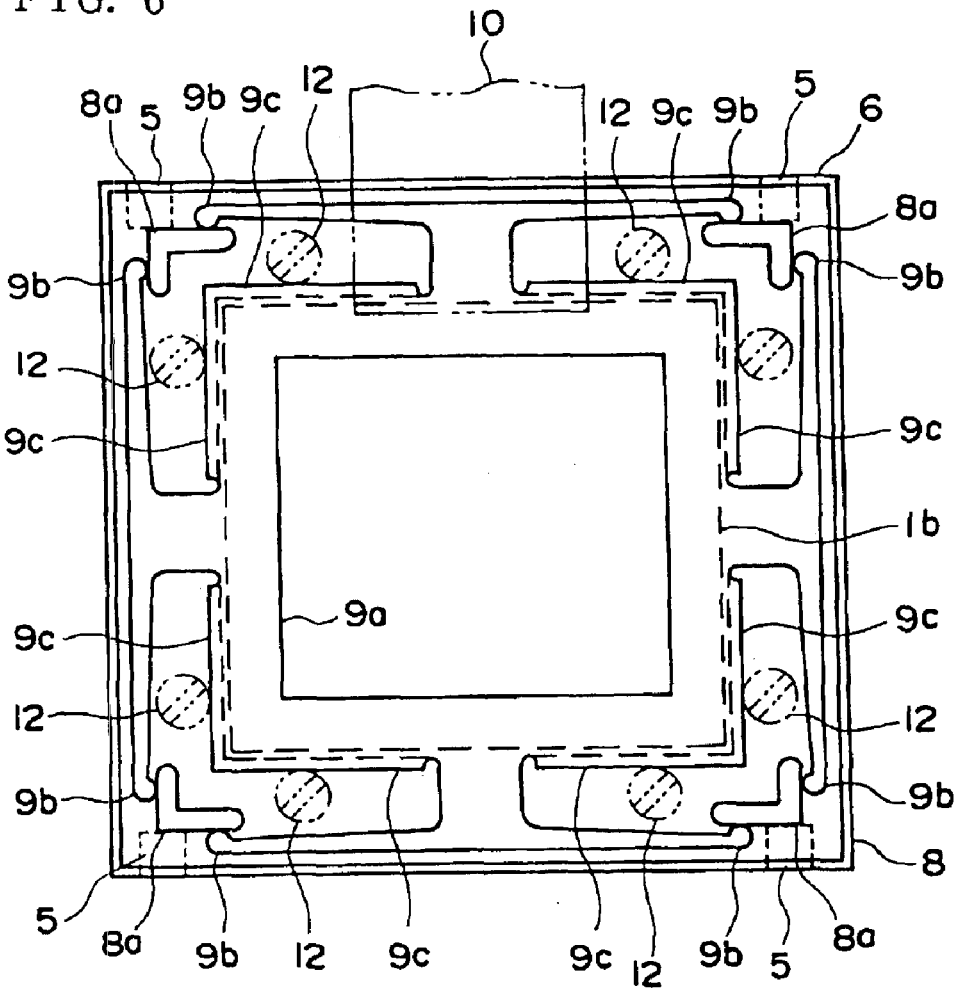
FIG. 6 is an enlarged front view of the optical unit in FIG. 5.

FIG. 5 is a top view showing the structure of a part of an optical unit of the liquid crystal projector of another embodiment of the present invention. FIG. 6 is an enlarged front view of the structure. In this case, portions different from the embodiment in FIG. 1 are described below. The frame 8 corresponding to the setting member 4 in FIG. 1 is made of a resin with a small thermal expansion coefficient (e.g. PPS or reinforced polycarbonate) having a high heat resistance and holds a holding member 9 made of metal. An L-type positioning portion 8a is protruded from four corners of the surface of the frame 8 and a slope 8b engaged with the wedge 5 is provided at the back of the frame 8.

A quadrangular window 9a is formed at the central portion of the holding member 9, and an adhesive to be hardened by visible light is applied to the circumference of the window 9a and the liquid crystal panel 1b is attached to the circumference to harden and fix the adhesive by applying light to the adhesive. Then, a non-light portion of the liquid crystal panel 1b is prevented from light by the frame portion around the window 9a. A flexible printed circuit board (FPC) 10 is conductively secured to the liquid crystal panel 1b by an anisotropic conductive film (ACF) 11 and extended to the outside from the recess of the frame 8. Moreover, a T-type elastic portion 9b is formed on the holding member 9, which is formed by being protruded from each side of the quadrangular frame of the body of the holding member 9 and expanded and the elastic portion 9b is temporarily secured to the positioning portion 8a of the frame 8 by using its elastic force. Then, corners of the body of the holding member 9 are permanently secured to the frame 8 by a visible-light-curing adhesive to be softened by heat and thus, a liquid crystal panel unit is formed. Moreover, the liquid crystal panels 1a and 1c are similarly set to the [photosynthetic] *light synthetic* prism 6 and thus, a liquid crystal panel unit corresponding to each of the panels is formed. Assembling and alignment control are performed in the same manner as that of FIG. 1 and thus, a prism unit is formed.

To replace defective liquid crystal panels 1a, 1b, and 1c after forming the prism unit in FIGS. 5 and 6, it is necessary to remove the holding member 9 after softening the adhesive by heating the bonding portion between the holding member 9 and the frame 8 in the same manner as that of FIG. 1. Then, by reassembling the defective liquid crystal panel unit as a non-defective one, performing assembling and alignment control same as described above, and performing the same bonding and securing again, it is possible to reproduce a product. In this case, focus control can be omitted by keeping the accuracy of the liquid crystal surface position of the liquid crystal panel unit within the tolerance. However, the operability is further improved without using an exclusive alignment controller by preparing the condition so that the alignment control can be performed by a person.

Figure 7A:
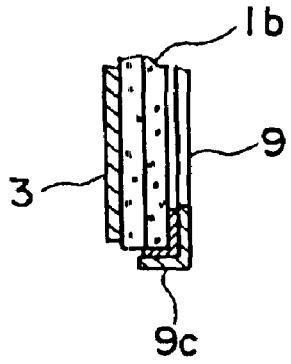
FIGS. 7A and 7B are local sectional views of the embodiments in FIGS. 5 and 6.
Figure 7B:
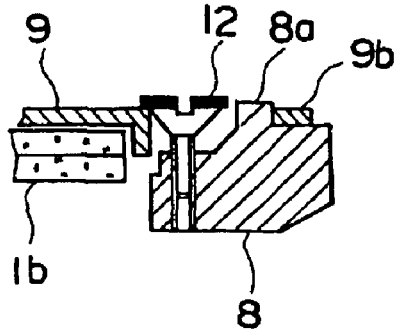

FIGS. 7A and 7B are local sectional views of the embodiment in FIGS. 5 and 6. In FIG. 7A, a plurality of local bent portions 9c are formed at the margin of the body of the holding member 9 to prevent the adhesive of the liquid crystal panel 1b from flowing. Formation of the bent portions 9c is effective to improve the sticking force to the liquid crystal panel 1b when the adhesive has a high flowability.

In FIG. 7B, the slope at the head of a flat countersunk head screw 12 is engaged with the margin of the body of the holding member 9 to adjust the rotation in X- and Y-axis directions and in a plane including X and Y axes. An adhesive is applied to the threaded portion of the flat countersunk head screw 12. The adhesive uses the anaerobic-curing type which adheres to a purposed member by a screw tightening force and cures. It is also possible to increase the looseness torque by forming a resin film on the threaded portion. Moreover, only by setting the flat countersunk head screw 12 to the side where the position of the liquid crystal panel 1b is deviated and adjusting it, the other side can be supported by the spring force of the elastic portion 9b.

Figure 7C:
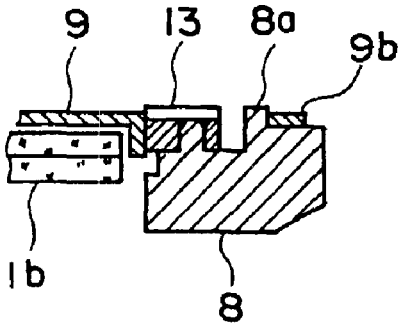
FIGS. 7C and 7D are sectional views showing an application example of the embodiment in FIG. 7B.
Figure 7D:
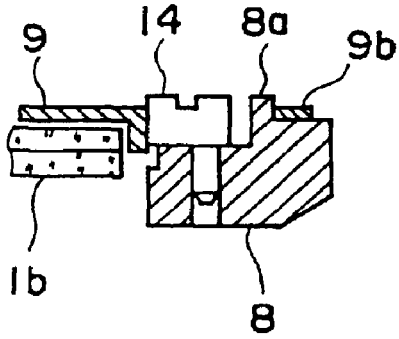

FIGS. 7C and 7D are local sectional views showing application examples of FIG. 7B. In the case of the example in FIG. 7C, an eccentric cam 13 set to a dowel is used instead of the flat countersunk head screw in FIG. 7B so as to obtain a friction torque. In the case of the example in FIG. 7D, an eccentric pin 14 is fitted into a hole instead of the eccentric cam 13. In these cases, the eccentric cam 13 or the eccentric pin 14 is secured by friction stop.

Figure 8:
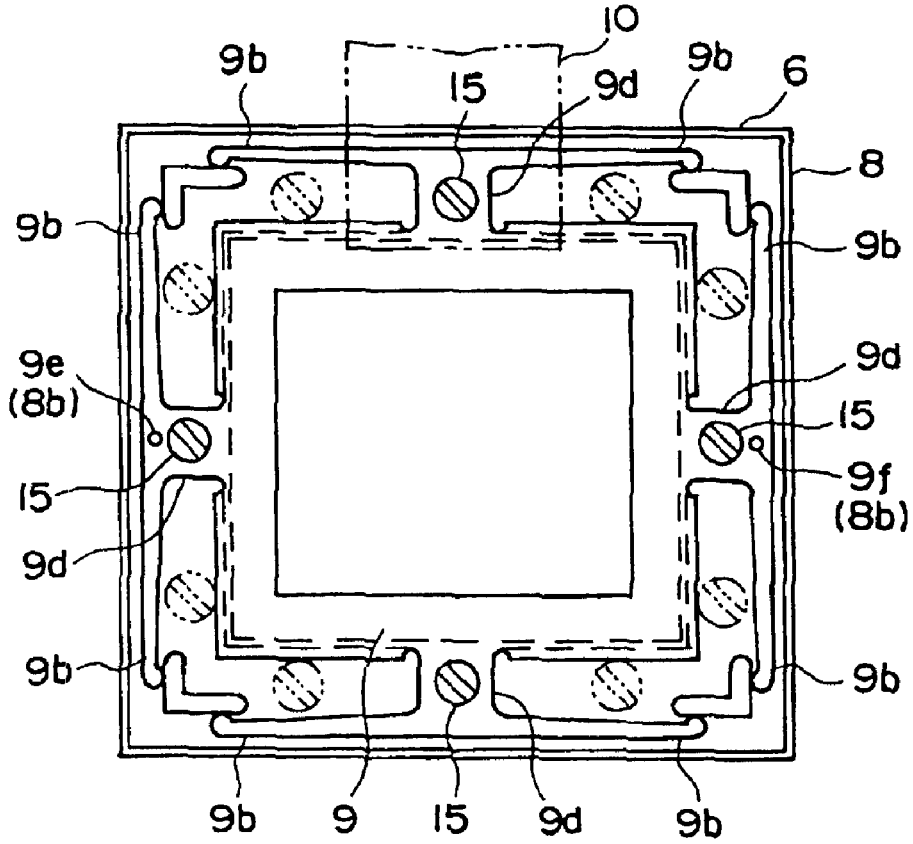
FIG. 8 is a front view showing another structure of the frame and holding member of the embodiment in FIG. 6.

FIG. 8 is a top view showing another structure of the frame 8 and holding member 9 of the embodiment in FIG. 6. Four joints 9d are formed between the body of the holding member 9 and the elastic portion 9b and two dowels 8b provided on the frame 8 are fitted into holes 9e and 9f provided on the joints 9d and the holding member 9 is secured to the frame 8 by four screws 15. The screws 15 also prevent the body from deforming such as warping or twisting due to the reactive force of the elastic portion 9b.

To replace a defractive liquid crystal panel with a non-defective one, the screws 15 must be removed to remove the defective liquid crystal panel unit. Then, the dowel 8b is cut off to temporarily fix the holding member 9 with a non-defective liquid crystal panel bonded by hanging the elastic portion 9b on the positioning portion 8a. Alignment control is performed by using the adjusting members 12, 13, and 14 shown in FIGS. 7B to 7D and thereafter, the holding member 9 is permanently fixed by the screws 15.

Figure 9:
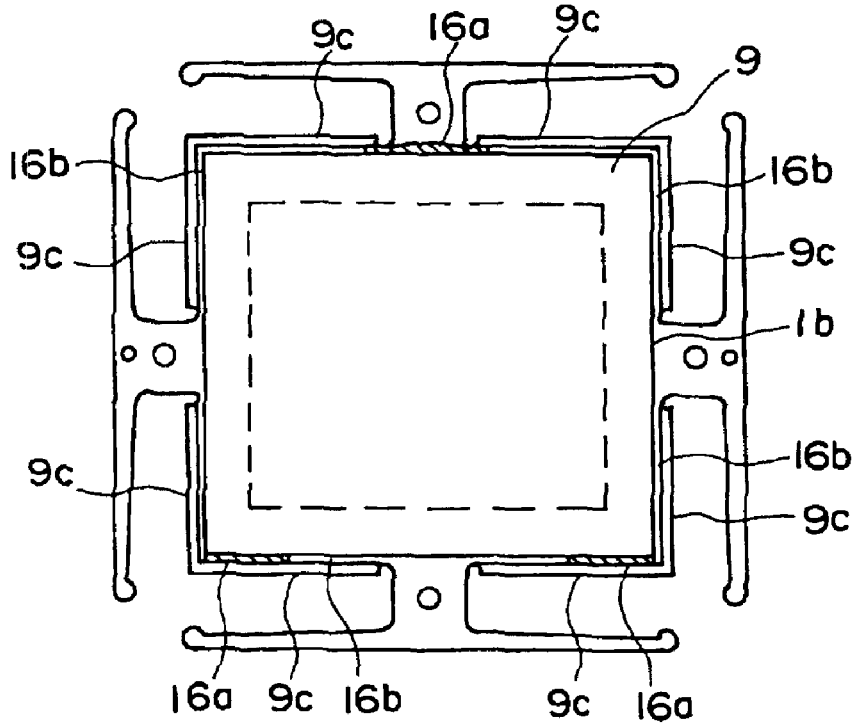
FIG. 9 is a front view showing the detail of the holding member in FIG. 8.

A structure for bonding and securing the liquid crystal panel 1b to the holding member 9 is described below by referring to FIG. 9. FIG. 9 is a front view of the holding member 9. The holding member 9 is set to a jig (not illustrated), the liquid crystal panel 1b is positioned, and a spindle (not illustrated) chucked in a vacuum state is lowered to set it onto the holding member 9. Under the above state, a visible-light-curing adhesive with a relatively high securing force is applied to a point 16a between the margin and the bent portion 9c of the liquid crystal panel 1b in the directions of 12, 4 and 8 o'clock of a clock. Then, visible light is applied to the adhesive to harden the adhesive and secure the liquid crystal panel 1b. Moreover, other portion 16b is reinforced and bonded by an elastic visible-light-curing adhesive like silicon resin. However, the other portion 16b can be omitted when the point 16a has a sufficient sticking strength. Moreover, by reinforcing the missing portion of the bent portion 9c with another member, the reinforcement effect is further obtained and the bent portion 9c is stabilized.

Figure 10:
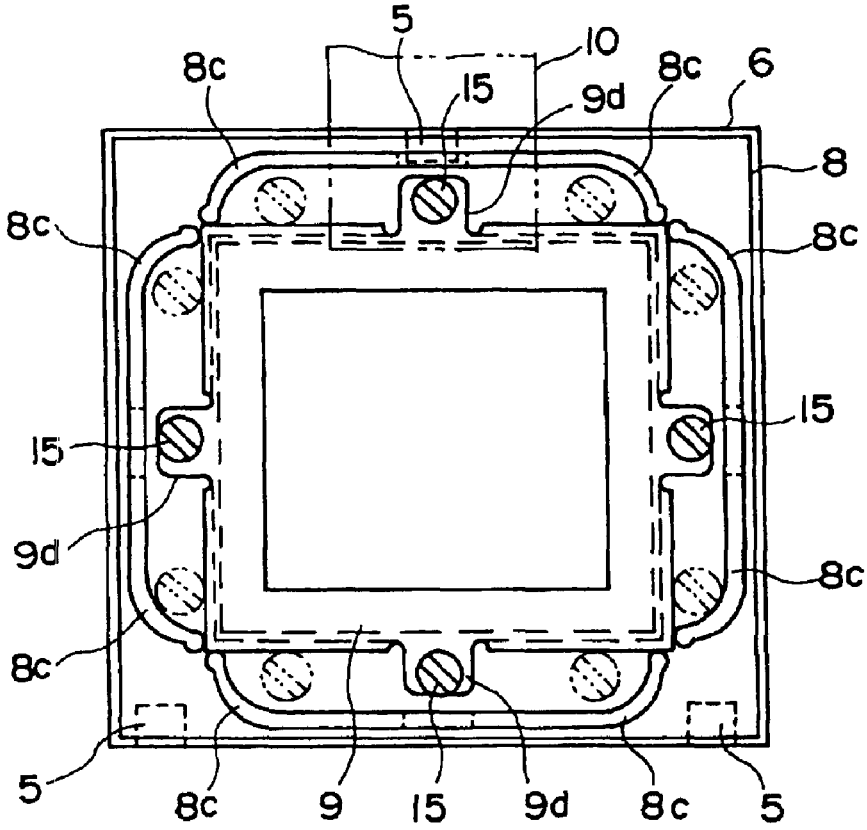
FIG. 10 is a front view showing still another structure of the frame and holding member of the embodiment in FIG. 6.
Figure 11:
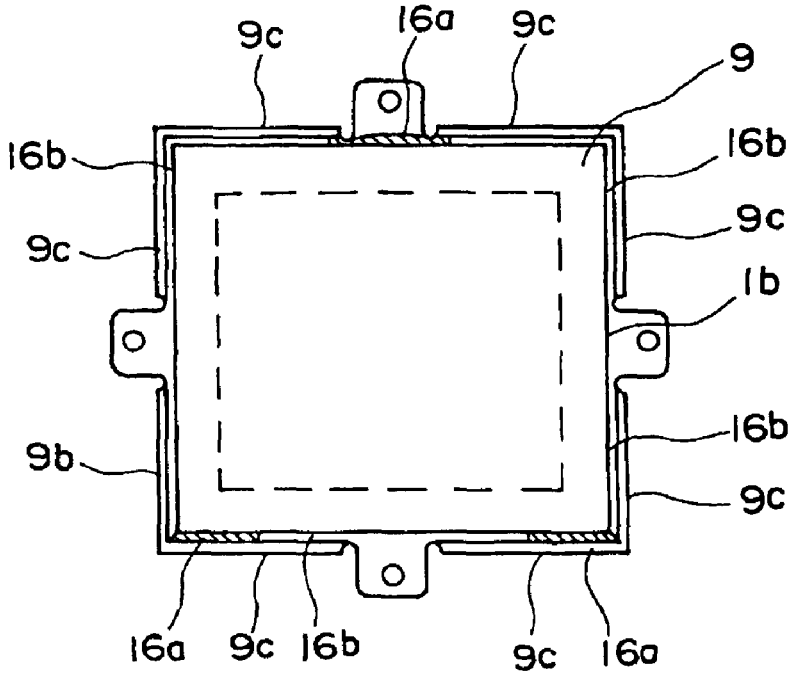
FIG. 11 is a front view showing the detail of the holding member in FIG. 10.

FIG. 10 is a top view showing still another structure of the frame 8 and holding member 9 of the embodiment in FIG. 6 and FIG. 11 is a top view showing the detail of the holding member 9. In the case of this embodiment, an elastic portion for temporarily fixing the frame 8 and holding member 9 is provided not on the holding member 9 but on the frame 8. Elastic portions 8c protruded from four corners of the body of the frame 8 contact the corners of the body of the holding member 9 to provide an elasticity for the corners and temporarily fix the body. Moreover, a protruded piece 9d of the holding member 9 is permanently fixed by the screw 15. Only the central portion connecting a pair of the elastic portions 8c is connected with the body of the frame 8 and other portions are lifted from the body of the frame 8. In the case of this embodiment, a case is shown in which position adjustment is performed at three points by a spacer 5.

Figure 12:
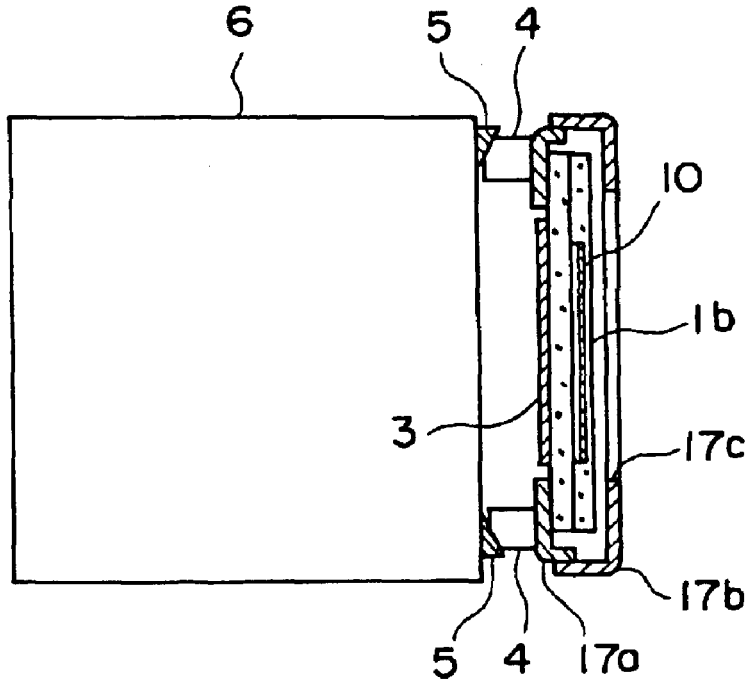
FIG. 12 is a top view showing the structure of a part of an optical unit of the liquid crystal projector of still another embodiment of the present invention.

FIG. 12 is a sectional view showing the structure of a part of the liquid crystal panel unit of still another embodiment of the present invention. In the case of this embodiment, a liquid crystal panel 1b is bonded and secured to shield cases 17a and 17b made of a conductive material such as metal in the same manner as that of the embodiment in FIG. 9. A quadrangular window is provided at the central portion of the shield cases 17a and 17b respectively and a window 17c provided on the shield case 17b has the same function as the window 9a provided on the holding member 9. Alignment control is performed similarly to the case of the embodiment in FIG. 1 to form a prism unit. By replacing the shield case 17b shown in FIG. 12 with the holding member 9 shown in FIG. 6, advantages of the both of them can effectively be shown.

Figure 13:
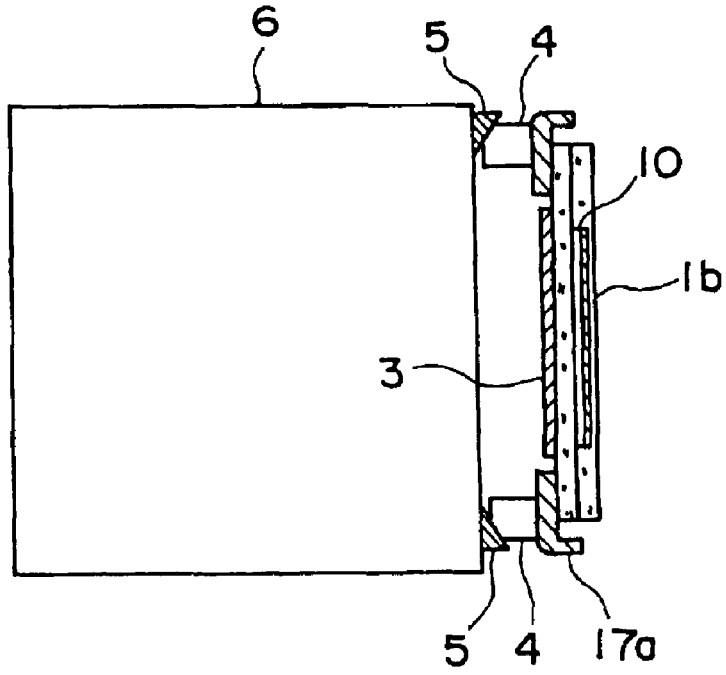
FIG. 13 is a top view showing an application example of the embodiment in FIG. 12.

FIG. 13 is a sectional view showing a modification of the embodiment in FIG. 12. This embodiment is an example when omitting the outside shield case 17b in a pair of shield cases 17a and 17b in FIG. 12.

In the case of the embodiments in FIGS. 12 and 13, a channel in the vertical direction (direction perpendicular to the paper surface) is formed by the light incident surface of a [photosynthetic] *light synthetic* prism 6, setting member 4, and polarization plate 3 and thereby, the incident surface of the [photosynthetic] *light synthetic* prism and the polarization plate 3 can effectively be cooled by supplying cold air from the bottom because there is not any obstacle.

Figure 14:
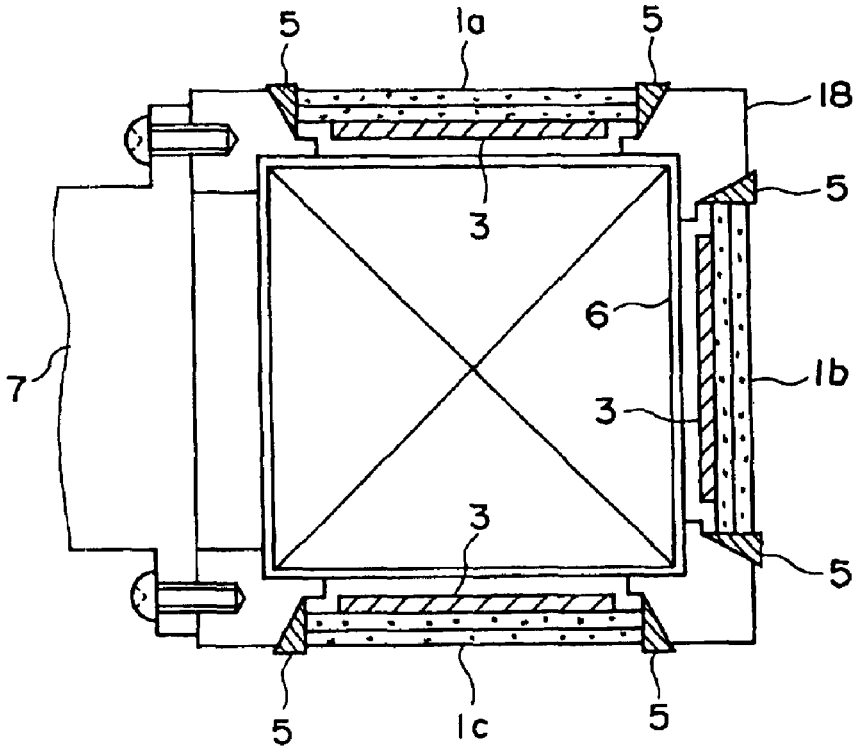
FIGS. 14 to 16 are top views respectively showing a part of an optical unit of the liquid crystal projector of still another embodiment of the present invention.

FIG. 14 is a top view showing the structure of a part of the optical unit of still another embodiment of the present invention. In the case of this embodiment, a [photosynthetic] *light synthetic* prism 6 is positioned and secured to a support frame 18. Liquid crystal panels 1a, 1b, and 1c are bonded and secured into three recesses provided on the support frame 18 through a spacer member 5 by a visible-light-curing adhesive to be softened by heating. Of course, alignment control is made in the same manner as that of FIG. 1. A support frame 18 forms an optical unit by securing a projection lens 7 with screws.

Figure 15:
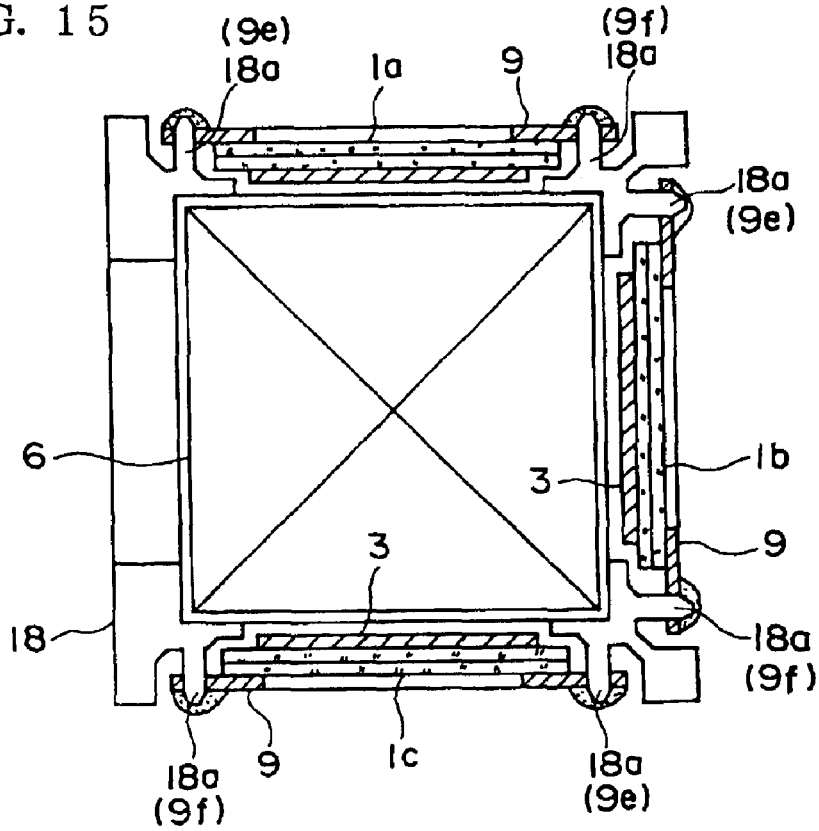

FIG. 15 is a top view of the optical unit of the application example of FIG. 14. In the case of this embodiment, two dowels 18a are provided on each recess of the support frame 18 in FIG. 14. Moreover, this embodiment uses a liquid crystal panel unit from which the elastic portion 9b of the holding member 9 in FIG. 5 is removed. Alignment control same as that of the embodiment in FIG. 1 is made possible by engaging holes 9e and 9f formed on the holding member 9 with dowels 18a so that backlash occurs. The dowels 18a are fixed with a visible-light-curing adhesive to be softened by heating. The structures in FIGS. 14 and 15 make it possible to replace a [photosynthetic] *light synthetic* prism 6 with a dichroic mirror.

Figure 16:
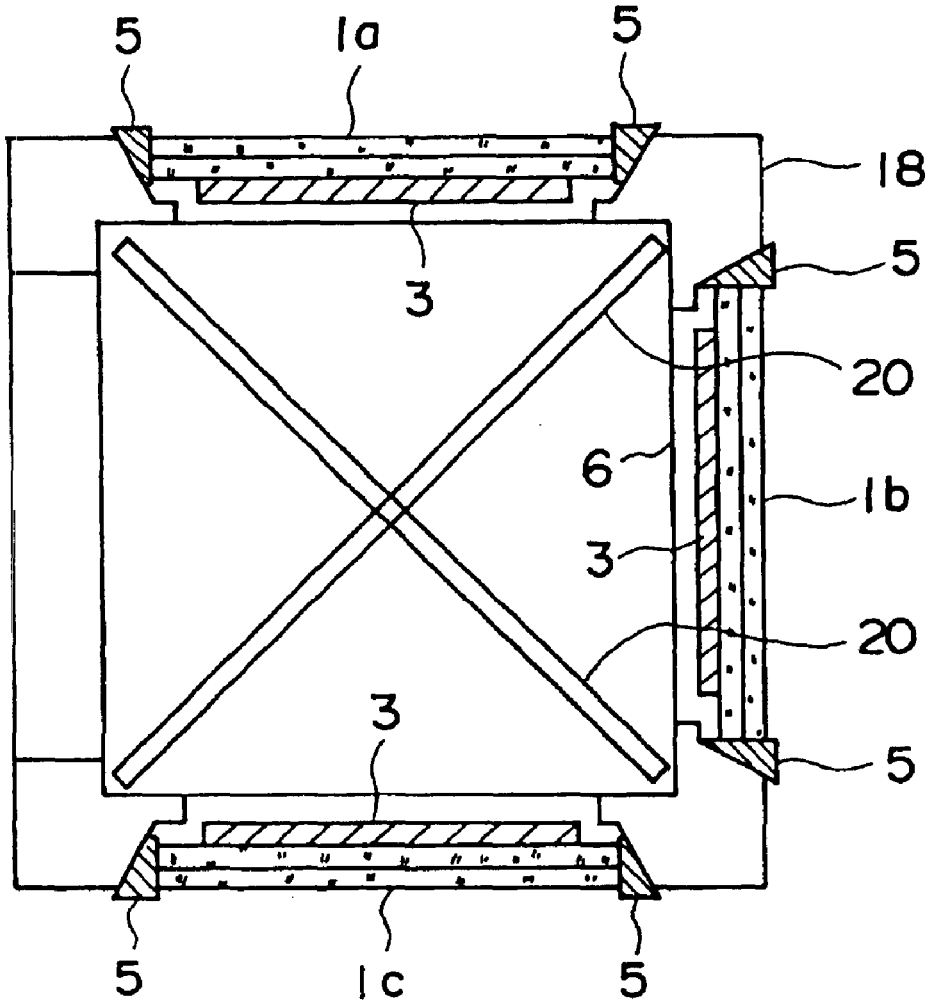

FIG. 16 is a sectional view of an embodiment in which the [photosynthetic] *light synthetic* prism in FIG. 14 is replaced with a dichroic mirror 20. Moreover, a support frame 18 can be integrated with the frame of an optical system for supporting a mirror for separating lamp light into red, green, and blue or a mirror for leading reflected light. Furthermore, it is possible to form an optical unit by storing the prism units in FIGS. 1, 5, 8, and 12 in the support frame 18.

Figure 17A:
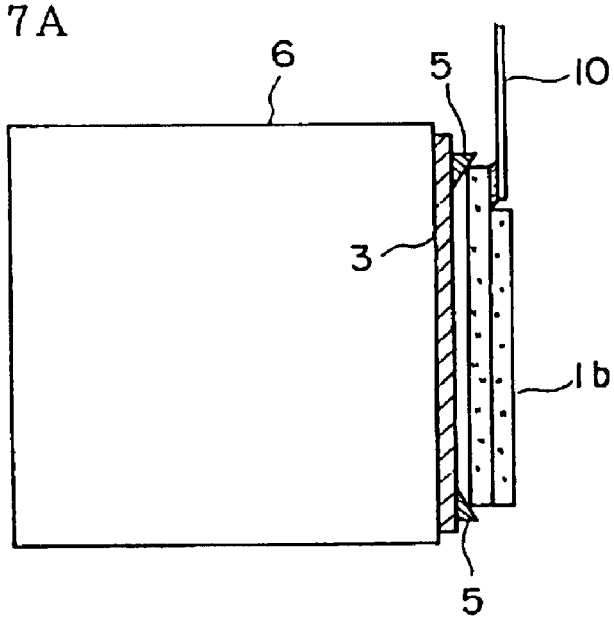
FIGS. 17A to 17C are top views respectively showing a part of an optical unit of the liquid crystal projector of still another embodiment of the present invention.
Figure 17B:
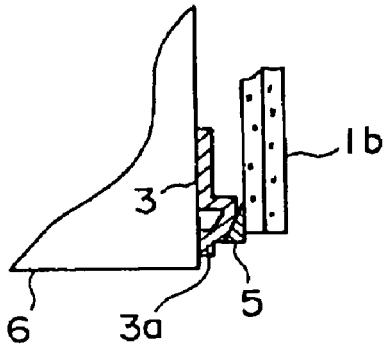

FIGS. 17A and 17B are top views showing the structure of a part of the optical unit of still another embodiment of the present invention. In the case of the embodiment in FIG. 17A, an outgoing-side polarization plate 3 is attached to the light incident surface of a [photosynthetic] *light synthetic* prism 6 and a liquid crystal panel 1b is set very closely to the polarization plate 3. When alignment control is performed in the same manner as that of the embodiment in FIG. 1 and positioning is completed, the liquid crystal panel 1b is bonded and fixed by a spacer member 5.

In the case of the embodiment in FIG. 17B, a protrusion 3a with a slope is formed on the outgoing-side polarization plate 3 and the slope of the protrusion 3a is engaged with the slope of the spacer member 5 to secure a stable bonding force.

Figure 17C:
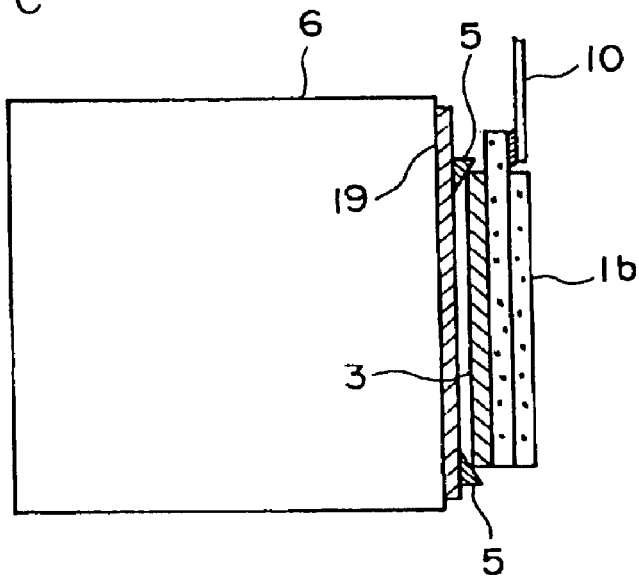

In the case of the embodiment in FIG. 17C, a transparent sheet member 19 is attached to the light incident surface of a [photosynthetic] *light synthetic* prism 6. Moreover, an outgoing-side polarization plate 3 is attached to a liquid crystal panel 1b. The liquid crystal panel 1b is bonded and fixed by setting a spacer member 5 between the transparent sheet member 19 and the outgoing-side polarization plate 3. To reproduce a defective liquid crystal panel 1, the outgoing-side polarization plate 3 is removed and then reattached in the case of the embodiments in FIGS. 17A and 17B but the transparent sheet member 19 is removed and reattached in the case of the embodiment in FIG. 17C. Of course, it is possible to replace the liquid crystal panel 1 by removing the spacer member 5.

In the above embodiments, though drawings are omitted, a cooling fan is set at the bottom of the [photosynthetic] *light synthetic* prism 6 in the cross-sectional direction. By blowing up cooling air by the cooling fan, produced heat is absorbed from the incident surface of a liquid crystal panel, outgoing-side polarization plate, and incoming-side polarization plate (not illustrated). Because the present invention makes it possible to omit a mechanism for alignment control and focus control, it is possible to expand a channel by a space equivalent to the omitted control mechanism. Moreover, it is possible to form a channel in the vertical direction by the setting member 4, frame 8, and support frame 18.

I claim:

1. A liquid crystal projector comprising:

three liquid crystal panels for modulating first color light, second color light, and third color light respectively;

light synthetic means for synthesizing each color light modulated by said liquid crystal panels;

a projection lens for projecting light synthesized by said light synthetic means;

setting members for setting said liquid crystal panels to said light synthetic means; and wedge-type spacer members for adjusting the position of said liquid crystal panels in their planar direction and the direction perpendicular to the planar direction; wherein said liquid crystal panels are secured to said light synthetic means through said setting members and said spacer members.

2. The liquid crystal projector of claim 1, wherein said liquid crystal panels, said setting members, said spacer members, and said light synthetic means are fixed to each other by an adhesive.

3. The liquid crystal projector of claim 2, wherein said adhesive is softened by heating.

4. The liquid crystal projector of claim 1, wherein said setting members and said spacer members are comprised of a member capable of transmitting light.

5. The liquid crystal projection of claim 1, wherein said spacer members are set between said setting members and said light synthetic means.

6. The liquid crystal projector of claim 1, wherein a pair of said setting members is arranged in the vertical direction of the facing side of said liquid crystal panels and a channel for passing cooling air is formed in the vertical direction by said pair of setting members, said liquid crystal panels, and said light synthetic means.

7. The liquid crystal projector of claim 1, wherein each of said liquid crystal panels is stored in and secured to a conductive shield case.

8. The liquid crystal projector of claim 1, wherein said spacer members are set between said setting members and said liquid crystal panels.

9. A liquid crystal projector comprising:

three liquid crystal panels for modulating first color light, second color light, and third color light respectively;

light synthetic means for synthesizing each color light modulated by said liquid crystal panels;

a projection lens for projecting light synthesized by said light synthetic means;

wedge-type spacer members for adjusting the position of said liquid crystal panels in their planar direction and the direction perpendicular to the planar direction; and protrusions respectively formed on each of incident surfaces of said light synthetic means and engaged with said spacer members; wherein said liquid crystal panels are secured to said light synthetic means through said spacer members and said protrusions.

10. A liquid crystal projector having an imaging optical system provided with a projection lens and light synthetic means, comprising:

at least one liquid crystal panel arranged at the object position of said imaging optical system;

a holding member to which said liquid crystal panel is secured;

a frame located between said holding member and said light synthetic means; and wedge-type spacer members located between said frame and said light synthetic means to adjust the position of said liquid crystal panel in its planar direction and the direction perpendicular to the planar direction; wherein said holding member is provided with a window which is opened at the central portion and said liquid crystal panel is arranged so as to cover the window and be secured to said frame, and said liquid crystal panel is secured to said light synthetic means through said holding member, said frame, and said spacer members.

11. The liquid crystal projector of claim 10, wherein a first portion of a margin of said liquid crystal panel is secured to said holding member by means of point bonding at least several points by an adhesive with a relatively high securing force and a complementary portion of said margin of said liquid crystal panel is fixed to said holding member by an elastic adhesive.

12. The liquid crystal projector of claim 11, wherein a position adjusting member for adjusting the position of said holding member is set to said frame.

13. The liquid crystal projector of claim 11, wherein said holding member has a body with said window in a central portion thereof, and further comprising elastic members for temporarily securing said body to said frame; and a joint between said body and each of said elastic members, the joint being secured to said frame by a screw.

14. A liquid crystal projector having an imaging optical system provided with a projection lens and light synthetic means, comprising:

at least one liquid crystal panel arranged at the object position of said imaging optical system;

a support frame arranged so as to face the incident surface of said light synthetic means and support the margin of said liquid crystal panel; and wedge-type spacer members located between said support frame and said liquid crystal panel to adjust the position of said liquid crystal panel in its planar direction and the direction perpendicular to the planar direction; wherein said liquid crystal panel is secured to said support frame through said spacer members.

15. The liquid crystal projector of claim 14, wherein said projection lens is secured to said support frame.

16. The liquid crystal projector of claim 14, wherein said support frame also serves as a frame of an optical system including a light separating system.

17. The liquid crystal projector of claim 14, wherein said light synthetic means is comprised of a cross dichroic mirror.

18. A liquid crystal projector having an imaging optical system provided with a projection lens and light synthetic means, comprising:

at least one liquid crystal panel arranged at the object position of said imaging optical system;

a support frame arranged so as to face the incident surface of said light synthetic means and having a plurality of protrusions; and a holding member to which said liquid crystal panel is secured, which has openings engaged with said protrusions, and in which said openings and said protrusions are bonded and fixed *to* each other; wherein said liquid crystal panel is secured to said support frame through said holding member.

19. A liquid crystal projector comprising:

three liquid crystal panels for modulating first color light, second color light, and third color light respectively;

light synthetic means for synthesizing each color light modulated by said liquid crystal panels;

polarization plates each of which is attached to the incident surface of said light synthetic means; and wedge-type spacer members to adjust the position of said liquid crystal panels in their planar direction and the direction perpendicular to the planar direction; wherein said liquid crystal panels are secured to said light synthetic means through said spacer members and said polarization plates.

20. A liquid crystal projector having an imaging optical system provided with a projection lens and light synthetic means, comprising:

at least one liquid crystal panel arranged at the object position of said imaging optical system;

a polarization plate attached to [the] *a* surface of said light synthetic means; and wedge-type spacer members located between said polarization plate and said liquid crystal panel to adjust the position of said liquid crystal panel in its planar direction and the direction perpendicular to the planar direction; wherein *said polarization plate has protrusions, each of said protrusions having a slope;*

[protrusions having a slope on said polarization plate,] said slope of said protrusions and said spacer members engaging each other for bonding and fixing by an adhesive, said liquid crystal panel being secured to said light synthetic means through *the slopes of* said spacer members and *the protrusions of* said polarization plate.

21. A liquid crystal projector having an imaging optical system provided with a projection lens and light synthetic means, comprising:

at least one liquid crystal panel arranged at the object position of said imaging optical system;

a polarization plate attached to the surface of said liquid crystal panel;

a transparent sheet attached to the incident surface of said light synthetic means; and wedge-type spacer members located between said polarization plate and said transparent sheet to adjust the position of said liquid crystal panel in its planar direction and the direction perpendicular to the planar direction; wherein said liquid crystal panel is secured to said light synthetic means through said polarization plate, said spacer members, and said transparent sheet.

*22. A projector, comprising:*

*three liquid crystal panels;*

*a light synthesizer that combines a first color light, a second color light and a third color light modulated by the respective three liquid crystal panels;*

*a projection lens that projects light combined by the light synthesizer;*

*first members located between at least one of the three liquid crystal panels and the light synthesizer, each of the first members having a first slope; and*

*second members located between the at least one of the three liquid crystal panels and the light synthesizer, each of the second members having a second slope,*

*the first slope and the second slope being in contact with each other so as to set a relative position of the at least one of the three liquid crystal panels to the light synthesizer.*

*23. A projector comprising:*

*a plurality of panels that modulate a plurality of color lights,*

*a light synthetic element that synthesizes the color lights modulated by the panels;*

*a projection lens that projects a light synthesized by the light synthetic element;*

*a plurality of setting members that separate the panels from the light synthetic element; and*

*a plurality of polarization plates arranged between the light synthetic element and the panels such that the setting members do not cover or contact with the polarization plates.*

*24. The projector according to claim 23, further comprising a plurality of spacer members that adjust the position of the panels, the setting members and the light synthetic elements being secured through the spacer member.*

*25. The projector according to claim 23, further comprising a plurality of spacer members that adjust the position of the panels, the setting members and the panels being secured through the spacer member.*

*26. The projector according to claim 23, wherein each of the panels is secured into a shield case.*

*27. The projector according to claim 23, further comprising a plurality of support frames each of which supports an edge of each of the panels.*

*28. The projector according to claim 23, wherein the setting members are fixed to the panels or to the light synthetic element by an adhesive, and are detachable by heating.*

*29. An assembling method for an optical unit including a plurality of modulators, a light synthetic element that synthesizes the color lights modulated by the modulators, a plurality of setting members that separate the modulators from the light synthetic element, and a plurality of spacer members that fix the modulators to the light synthetic element, comprising steps of:*

*(a) fixing each of the setting members to each of the modulators or the light synthetic element;*

*(b) adjusting positions of each of the modulators; and*

*(c) fixing each of the spacer members between the light synthetic element of each of the modulators and each of the setting members.*

*30. The assembling method according to claim 29, wherein the step (b) includes a step of sliding each of the modulators by an eccentric cam, a flat countersunk head screw, or an eccentric pin.*

*31. An assembling method for an optical unit including a plurality of modulators, a light synthetic element that synthesizes the color lights modulated by the modulators, and a plurality of spacer members that fix the modulators to the light synthetic element, comprising steps of:*

*(a) adjusting positions of each of the modulators; and*

*(b) fixing each of the spacer members between the light synthetic element and each of the modulators.*

*32. An assembling method for an optical unit including a plurality of modulators, a light synthetic element that synthesizes the color lights modulated by the modulators, a plurality of setting members that set the modulators to the light synthetic element, and a plurality of spacer members that fix the modulators to the light synthetic element, comprising steps of:*

*(a) fixing the setting members to one of the modulators or the light synthetic element, adjusting a position of the one of the modulators, and fixing the spacer members between the light synthetic element or the one of the modulators and the setting members; and*

*(b) fixing the setting members to each of the other modulators or the light synthetic element, adjusting a position of each of the other modulators, and fixing the spacer members between the light synthetic element or each of the other modulators and the setting members, after the step (a).*

*33. The assembling method for a optical unit according to claim 32, wherein the step (a) includes a step of sliding the one of the modulators by a eccentric cam, a flat countersunk head screw, or an eccentric pin, and the step (b) includes a step of sliding each of the other modulators by a eccentric cam, a flat countersunk head screw, or an eccentric pin.*

*34. An assembling method for an optical unit including a plurality of modulators, a light synthetic element that synthesizes lights modulated by the modulators, and a plurality*

*of spacer members that fix the modulators to the light synthetic element, comprising steps of:*

(*a*) *adjusting a position of one of the modulators; and fixing the spacer members between the light synthetic element and the one of the modulators; and*

(*b*) *adjusting a position of the other modulators; and fixing the spacer members between the light synthetic element and the other modulators, after the step* (*a*).

*35. An assembling apparatus for assembling an optical unit including a plurality of modulators, a synthetic element that synthesizes lights modulated by the modulators, a projection lens that projects a light synthesized by the synthetic element, and a plurality of setting members that separate the modulators from the light synthetic element, comprising:*

*a manipulator that adjusts positions of the modulators;*

*a controller that controls the manipulator; and*

*a camera that picks up an image from the projection lens directly or an image projected onto a screen by the projection lens.*

*36. The assembling apparatus according to claim 35, further comprising a display that displays a signal of the image picked up by the camera.*

*37. The assembling apparatus according to claim 35, wherein the manipulator adjusts the position of the modulators in two axes directions vertical to the optical axis of the projection lens, two rotational directions about the two axes, a rotation direction in a plane formed by the two axes, and a focusing direction.*

*38. A projector comprising:*

*a plurality of panels that modulate a plurality of color lights,*

*a light synthetic element that synthesizes the color lights modulated by the panels;*

*a projection lens that projects a light synthesized by the light synthetic element;*

*a plurality of holding members to which the panels are secured;*

*a plurality of setting members arranged between the panels and the light synthetic element, the plurality of holding members and the plurality of setting members fixed together by screws and are detachable; and*

*a plurality of spacer members through which the setting members and the light synthetic elements are secured.*

*39. A projector comprising:*

*a plurality of panels that modulate a plurality of color lights;*

*a light synthetic element that synthesizes the color lights modulated by the panels;*

*a projection lens that projects a light synthesized by the light synthetic element;*

*a holding member to which the panels are secured;*

*a setting member arranged between the panels and the light synthetic element and detachably bonded to the holding member; and*

*a plurality of screws that engage the holding member to adjust its position.*

*40. An assembling method for an optical unit including a plurality of modulators, a light synthetic element that synthesizes color lights modulated by the modulators, a plurality of setting members that separate the modulators from the light synthetic element, and a plurality of spacer members that fix the modulators to the light synthetic element, comprising the steps of:*

(*a*) *fixing each of the setting members to each of the modulators or the light synthetic element;*

(*b*) *adjusting positions of each of the modulators; and*

(*c*) *fixing each of the spacer members which is coated with a photo-curing adhesive between the light synthetic element or each of the modulators and each of the setting members by hardening the adhesive by applying light.*

*41. An assembling method for an optical unit including a plurality of modulators, a light synthetic element that synthesizes color lights modulated by the modulators, and a plurality of spacer members that fix the modulators to the light synthetic element, comprising the steps of:*

(*a*) *adjusting positions of each of the modulators; and*

(*b*) *fixing each of the spacer members which is coated with a photo-curing adhesive between the light synthetic element and each of the modulators by hardening the adhesive by applying light.*

*42. An assembling method for an optical unit including a plurality of modulators, a light synthetic element that synthesizes color lights modulated by the modulators, a plurality of setting members that separate the modulators from the light synthetic element, and a plurality of spacer members that fix the modulators to the light synthetic element, comprising the steps of:*

(*a*) *fixing each of the setting members to the light synthetic element or the modulators; adjusting position of one of the modulators; fixing some of the spacer members coated with a photo-curing adhesive between the light synthetic element or one of the modulators and some of the setting members by hardening the adhesive by applying light; and*

(*b*) *after the step* (*a*), *adjusting a position of one of the other modulators; fixing other spacer members which are coated with a photo-curing adhesive between the light synthetic element or one of the other modulators and some of the setting members by hardening the adhesive by applying light.*

*43. An assembling method for an optical unit including a plurality of modulators, a light synthetic element that synthesizes the color lights modulated by the modulators, and a plurality of spacer members that fix the modulators to the light synthetic element, comprising the steps of:*

(*a*) *adjusting a position of one of the modulators; fixing some of the spacer members coated with a photo-curing adhesive between the light synthetic element and one of the modulators by hardening the adhesive by applying light; and*

(*b*) *after the step* (*a*), *adjusting a position of one of the other modulators; fixing other spacer members which are coated with a photo-curing adhesive between the light synthetic element and one of the other modulators and some of the setting members by hardening the adhesive by applying light; fixing each of the spacer members coated with a photo-curing adhesive between the light synthetic element and each of the modulators by hardening the adhesive by applying light.*

*44. An assembling method for an optical unit including a plurality of modulators, a light synthetic element that synthesizes color lights modulated by the modulators, a plurality of setting members that separate the modulators from the light synthetic element, and a plurality of spacer members that fix the modulators to the light synthetic element, comprising the steps of:*

(*a*) *fixing each of the setting members to each of the modulators or the light synthetic element;*

(*b*) *adjusting positions of each of the modulators by an alignment controller; and*

(*c*) *fixing each of the spacer members between the light synthetic element or each of the modulators and each of the setting members.*

*45. An assembling method for an optical unit including a plurality of modulators, a light synthetic element that synthesizes color lights modulated by modulators, and a plurality of spacer members that fix the modulators to the light synthetic element, comprising the steps of:*

(*a*) *adjusting the positions of each of the modulators by an alignment controller; and*

(*b*) *fixing each of the spacer members between the light synthetic element and each of the modulators.*

*46. An assembling method for an optical unit including a plurality of modulators, a light synthetic element that synthesizes color lights modulated by the modulators, a plurality of setting members that separate the modulators from the light synthetic element, and a plurality of spacer members that fix the modulators to the light synthetic element, comprising the steps of:*

(*a*) *fixing each of the setting members to the light synthetic element or the modulators; adjusting a position of one of the modulators by an alignment controller; fixing some of the spacer members between the light synthetic element or one of the modulators and some of the setting members; and*

(*b*) *after the step* (*a*), *adjusting a position of one of the other modulators by an alignment controller; fixing other spacer members between the light synthetic element or one of the other modulators and some of the setting members.*

*47. An assembling method for an optical unit including a plurality of modulators, a light synthetic element that synthesizes color lights modulated by the modulators, and a plurality of spacer members that fix the modulators to the light synthetic element, comprising the steps of:*

(*a*) *adjusting a position of one of the modulators; fixing some of the spacer members between the light synthetic element and one of the modulators; and*

(*b*) *after the step* (*a*), *adjusting a position of one of the other modulators; fixing other spacer members between the light synthetic element and one of the other modulators; fixing each of the spacer members coated with a photo-curing adhesive between the light synthetic element and each of the modulators by hardening the adhesive by applying light.*

*48. The assembling methods for an optical unit according to claims 29, 31, 32 or 34 wherein the spacer members are detachable by heat.*

* * * * *